Figure 1:
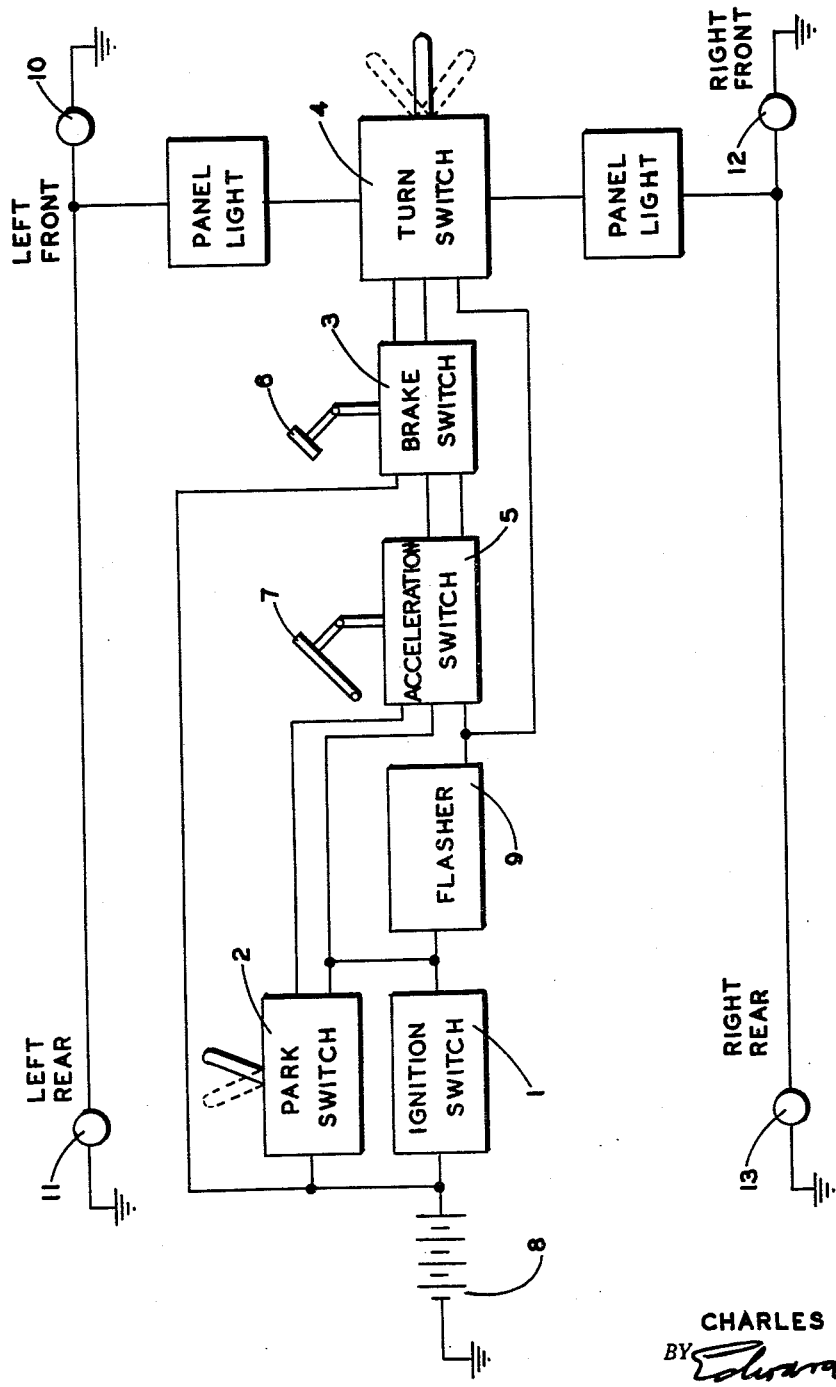

Oct. 18, 1960 C. R. DAWS 2,957,161
DIRECTION SIGNAL CIRCUIT
Filed Sept. 7, 1956 2 Sheets-Sheet 1

INVENTOR.
CHARLES R. DAWS
BY
ATTORNEY

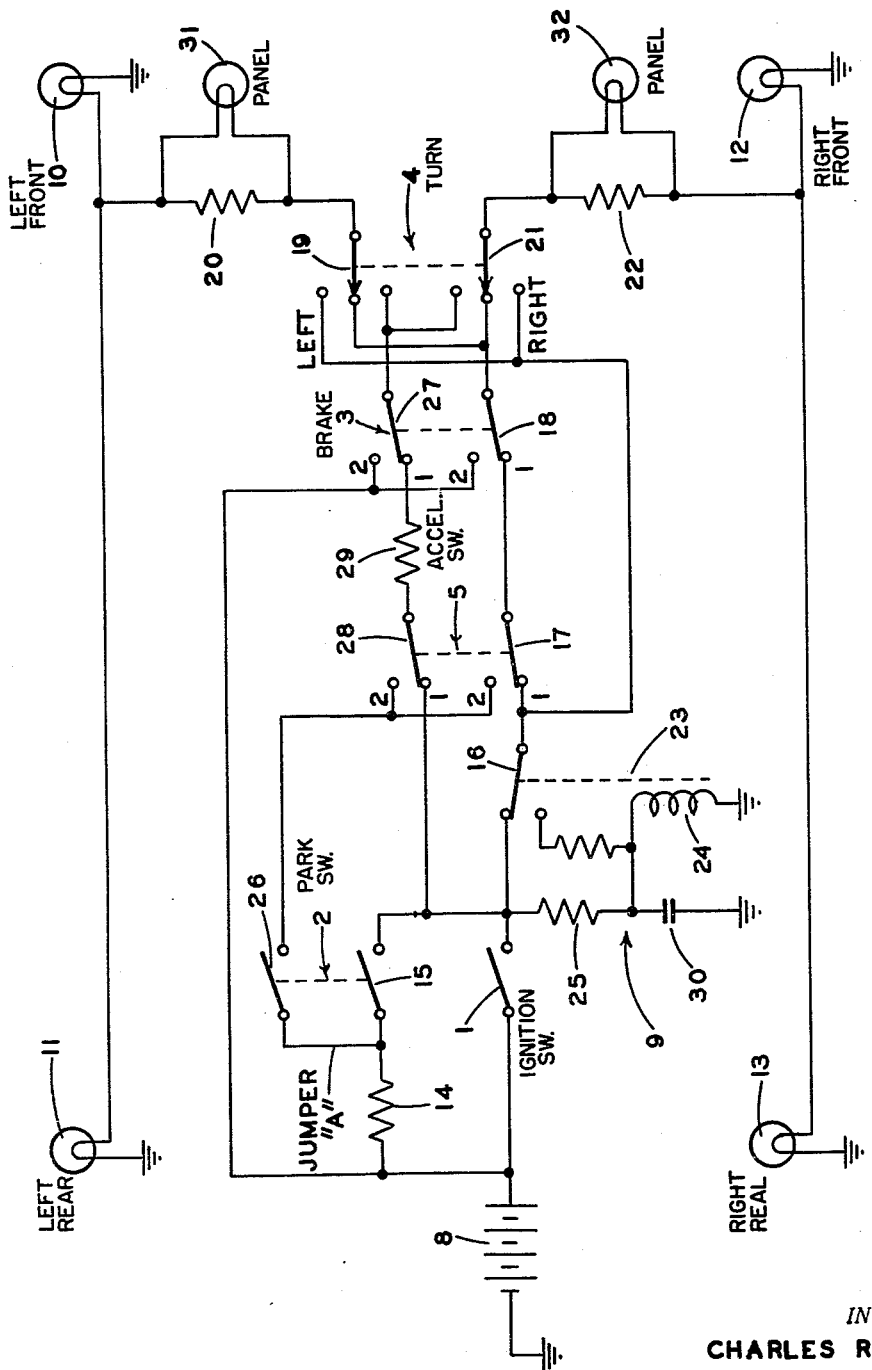

United States Patent Office 2,957,161
Patented Oct. 18, 1960

2,957,161

DIRECTION SIGNAL CIRCUIT

Charles R. Daws, 1412 Kettering, Lancaster, Calif.

Filed Sept. 7, 1956, Ser. No. 608,575

5 Claims. (Cl. 340—73)

This invention relates to direction signal circuits and particularly to a direction signal circuit for use on automobiles and trucks.

In the past, motor vehicles, such as automobiles and trucks, have been equipped with direction signal circuits. Past circuits have indicated a contemplated turning of the motor vehicle by utilizing flashing lights in the front and rear of the vehicle and on the side toward which the operator was contemplating turning. These circuits have also indicated a braking condition of the vehicle by one or more bright lights of constant intensity in the rear of the vehicle. A parking or "twilight" traveling condition was indicated by low intensity lights of constant magnitude in the front and rear of the motor vehicle.

It is to be noted that the basis for all direction signal lights of like nature placed on motor vehicles is to communicate information to the operators of other motor vehicles and to pedestrians relative to the present actions and contemplated future actions of the operator of the instant vehicle. It is to be desired that an optimum amount of information be conveyed to such persons in the shortest possible time.

The past direction signal circuits, described above, are subject to serious deficiencies insofar as the safe operation of motor vehicles is concerned. It has been found desirable to provide a forward indication of the braking condition of the motor vehicle. Thus, it is frequently desirable for a pedestrian entering a crosswalk or a motorist entering a highway from a side street or turning across the path of an oncoming vehicle to know whether that oncoming vehicle is applying his brakes or not.

The past direction signal circuits have also provided no indication of the condition of operation of the motor vehicle known as "coasting" or decelerating without the application of brakes. There is a finite time interval between the removal of the foot of the operator of a motor vehicle from the accelerator and the depression of the brake pedal. By providing an indication of the instant the operator releases the accelerator, advance warning is provided to the operator of the rear vehicle that the car in front of him is slowing down and might be about to apply the brakes. Further, at high speeds the mere removal of the foot from the accelerator causes a fairly rapid deceleration of a motor vehicle. In the past the operators of rear vehicles had to depend on the visual lessening of the distance between his vehicle and the vehicle in front of him to indicate this deceleration. Finally, past direction signal circuits did not provide for any indication of an emergency stop condition.

It is therefore an object of this invention to provide an improved direction signal circuit for motor vehicles.

It is another object of this invention to provide a direction signal circuit for motor vehicles which includes means for visually indicating by coded light signals the vehicle operating conditions of parking, coasting, braking, turning, simultaneous braking and turning, and emergency parking.

It is a further object of this invention to provide in a direction signal circuit for motor vehicles means for indicating by individually coded light signals in the front and rear of the motor vehicle the vehicle operating conditions of coasting and parking with over-riding coded signals for braking or future turning with a separate coded signal for simultaneous braking and future turning.

It is another object of this invention to provide in a direction signal circuit for motor vehicles means for visually indicating the coasting condition of operation of the vehicle.

Other objects of this invention will become apparent from the following description taken in connection with the accompanying drawings in which:

Figure 1 is a block diagram, partly schematic, of a preferred embodiment of the direction signal circuit contemplated by this invention, and Figure 2 is a schematic drawing of the direction signal circuit of Figure 1.

Referring now to Figure 1 a block diagram, partly schematic, of a preferred embodiment of the direction signal circuit contemplated by this invention is shown. In this embodiment there is provided ignition switch 1, park switch 2, brake switch 3, turn switch 4 and accelerator switch 5. Each of these switches are positioned in the motor vehicle in a manner to be actuated either manually at the will of the operator or automatically upon a preselected action of the operator. Since the preferred operation of the direction signal circuit of this invention would entail a minimum of manual functions by the operator, as many as possible of the switches should be positioned to be actuated automatically. However, it is readily apparent that all of the above-mentioned switches can be positioned to be manually actuated at the will of the operator.

Ignition switch 1 is normally open when the vehicle is not operating but is preferably positioned to be closed automatically when the operator turns on the ignition. Park switch 2 is normally open for daylight travel, but is preferably closed manually by the operator at twilight or while parked at night. Brake switch 3 is preferably a double-pole, double-throw switch, i.e., a switch having two contact arms insulated from each other and adapted to move in unison between two positions, which is automatically actuated by depression of foot brake pedal 6 by the operator. Turn switch 4 is preferably a double-pole, triple-throw switch, i.e., a switch having two contact arms insulated from each other and adapted to move in unison between three positions, which is manually operated between a neutral position and two selectively settable positions at the will of the operator. Accelerator switch 5 is preferably a double-pole, double-throw switch which is automatically switched from one position to another when the operator depresses or releases accelerator pedal 7 in the normal operation of the vehicle. Thus, it can be assumed that switch 5 is actuated automatically when the operator releases the pressure on the accelerator padal and de-actuated when the operator depresses pedal 7. Each of these switches is constructed and positioned in accordance with principles well known to those skilled in the art and need not be further described here.

Battery 8 is a conventional 6 volt or 12 volt storage battery used as a source of current in most of the present day motor vehicles. Flasher 9 is provided to furnish intermittent coupling between battery 8 and lamps 10, 11, 12 and 13 under certain conditions to be described later. A preferred circuit for flasher 9 is shown in Figure 2 and will be described in detail later. Left front lamp 10 and right front lamp 12 are positioned in the front end of the vehicle and are preferably provided with white lenses. Left rear lamp 11 and right rear lamp 13 are positioned in the rear end of the vehicle and are preferably provided with red lenses.

Referring now to Figure 2 a schematic drawing of a preferred embodiment of the direction signal circuit contemplated by this invention is shown. In this drawing ignition switch 1 is in the Off position, park switch 2 is in the Off position, brake switch 3 is unactuated, i.e., brake pedal 6 is not depressed, turn switch 4 is in the neutral position, and accelerator switch 5 is in the actuated position indicating the operator is not depressing accelerator pedal 7. This would be the conditions of the switches if the vehicle was parked in the daytime. Under these assumed initial conditions, the front and rear lamps are all in the unlighted condition.

The operation of the direction signal circuit of this invention can best be described by illustration with an enumeration of the various possible conditions of operation of the motor vehicle and the resulting code of signals corresponding to each condition.

First, consider the night parking condition. In this condition, the operator of the motor vehicle actuates only the park switch on his dashboard. Assuming switches 1, 3, 4 and 5 are in the conditions shown, lights 10, 11, 12 and 13 are energized from battery 8 via resistor 14, contact 15, contact 16, contact 17, contact 18, and contact 19 and resistor 20 or contact 21 and resistor 22. Resistor 14 is selected with a large enough resistance to prevent the actuation of relay 23 as a result of the current flow through relay coil 24 via resistor 14, contact 15 and resistor 25. Therefore, all of lights 10, 11, 12 and 13 shine with a comparatively dim intensity due to the voltage drop across resistor 14.

Second, consider the driving condition. In this condition, ignition switch 1 is in the closed position, switches 3 and 4 are in the positions shown in Figure 2, while switch 5 is in the unactuated position or posiiton #2 of Figure 2. If park switch 2 is in the Off position, none of the lights in the front and rear of the vehicle are energized. If, however, park switch 2 is in the On position, all of the lights are either energized or not energized, depending on whether jumper A is in the position shown or has been removed, respectively. When the vehicle is being operated with the park switch On, this is known as a twilight operation. In some States such driving is prohibited, i.e., it is illegal to drive with only the "park" lights on. In such States jumper A should be removed, thereby insuring that the circuit between battery 8 and the lights is always open. In all other States, jumper A should be connected in the position shown in Figure 2, thereby providing a continuous connection between the lights and battery 8 via resistor 14, contact 26, contact 17, contact 18 and contact 19 and resistor 20 or contact 21 and resistor 22.

Third, consider the turn condition of operation while driving. When turn switch 4 is in the Left position, left front and rear lights 10 and 11 are energized from battery 8 via switch 1, contact 16, contact 19 and resistor 20. For the present assume that flasher 9 intermittently interrupts the current flowing from battery 8 through contact 16 whenever contact 16 is connected directly to any of the lights. Therefore, any lamps which are connected to battery 8 through contact 16 of flasher 9 periodically flash instead of glowing steadily. Thus in the aforementioned left positioning of switch 4, lamps 10 and 11 flash. Similarly if switch 4 is in the Right position, lights 12 and 13 intermittently flash since they are connected to battery 8 via switch 1, contact 16, contact 21 and resistor 22.

Fourth, consider the operation of the circuit when brake switch 3 is actuated by the depression of the brake pedal by the operator. It does not matter what positions park switch 2 and accelerator switch 5 are in, since, as long as switch 4 is in the neutral position, all of the lights are connected directly to battery 8 via contact 18, and contact 19 and resistor 20 or contact 21 and resistor 22. All of the lights therefore continuously burn brightly.

Fifth, consider the simultaneous actuation of brake switch 3 while turn switch 4 is in one of the two selectively settable positions, Left or Right. If turn switch 4 is in the Left position, lamps 10 and 11 continue to be connected to battery 8 through flasher 9. Since brake switch 3 is also actuated, right lamps 12 and 13 are connected directly to battery 8 through contact 27, contact 21 and resistor 22. The right lamps therefore burn brightly continuously while the left lamps flash. Similarly, if switch 4 is in the Right position, lamps 12 and 13 are connected to battery 8 through flasher 9 while lamps 10 and 11 are connected directly to battery 8 via switch 3, contact 19 and resistor 20. The left lamps therefore burn brightly continuously while the right lamps flash.

Sixth, consider the condition of operation known as coasting. Under these conditions switches 3 and 5 are in the positions shown in Figure 2, the condition of switch 2 is not important, while initially assume the position of switch 4 is in the neutral position as shown. All of the lights 10, 11, 12, and 13 are now connected to battery 8 via switch 1, contact 16, contact 17, contact 18, and contact 19 and resistor 20 or contact 21 and resistor 22. All of the lights therefore flash intermittently since all are connected through contact 16 to battery 8. If turn switch 4 is in the Left position, only lamps 10 and 11 are connected through flasher 9 to battery 8 while lamps 12 and 13 are connected directly to battery 8 via switch 1, contact 28, resistor 29, contact 27 and contact 21 and resistor 22. The turning indication therefore overcomes the coasting indication. Similarly if turn switch 4 is in the Right position right lamps 12 and 13 are energized from battery 8 via flasher 9 while left lamps 10 and 11 are connected directly to battery 8.

The last condiiton of operation to be considered is the emergency stop or the stopped condition with the ignition switch On. Under these conditions switch 1 is closed while switches 3 and 5 are in the positions shown in Figure 2. It does not matter what position switch 2 is in. Normally turn switch 4 is also in the neutral position as shown in Figure 2. All of the lights 10, 11, 12 and 13 are now connected to battery 8 through flasher 9. All of the lights therefore intermittently flash, giving warning to other vehicles of the emergency condition of the parked vehicle. This condition has an additional advantage of clearly indicating to a motorist who leaves his vehicle with the ignition On, of such condition. Since many cars are stolen as a result of such carelessness, this condition of operation should reduce the danger.

Flasher 9 of Figure 2 accomplishes the intermittent connect-disconnect function by automatically switching the connections to the lights between a high voltage (the voltage of battery 8) and a comparatively low voltage whenever the flasher is loaded by a path to ground through contact 16. Thus, when ignition switch 1 is initially closed, capacitor 30 acquires a charge through timing resistor 25. When the charge on capacitor 30 reaches a preselected magnitude, sufficient current flows through relay coil 24 to cause actuation of relay 23 and the switching of contact 16. Contact 16 remains in the switched position until the right terminal of contact 16 is connected to ground through the signal lamps by the actuation of an appropriate switch. Such a grounding connection provides an additional path for the charge on capacitor 30 to bleed off to ground. As the charge on capacitor 30 drops to a preselected value, it is no longer able to supply sufficient current through coil 24 to maintain the relay closed. Contact 16 returns to the unactuated position thereby subjecting the lamps to the full battery voltage and causing them to light. Capacitor 30 again starts to recharge and eventually reactuates relay 23. This series of steps of charging and discharging capacitor 30 continues as long as the lamps are directly connected to contact 16.

Left and right dash lights 31 and 32 provide a visual indication to the operator of the motor vehicle as to the signals being transmitted by the signal lamps. By appropriately selecting the bulbs used for lights 31 and 32 and the magnitudes of resistors 20 and 22, the bulbs become an indication of the operativeness of the signal lamps. It is obvious that if both lamps 10 and 11 are burned out, then left dash lamp 31 will not light under any conditions. Assume, however, that only one of the lamps 10 or 11 burns out. If, by way of example, and not by way of limitation, each of lamps 10 and 11 normally draws one ampere of current, then normally two amperes of current flows through resistor 20 thereby creating a voltage drop across resistor 20 sufficient to light dash light 31. Since under the assumed condition only one of lamps 10 and 11 are energized, the current through resistor 20 is only one ampere. The resulting voltage drop across resistor 20 being insufficient to cause the lighting of dash light 31, is immediately apparent to the operator of the vehicle who thereby knows there is a defect in his left lamp circuit.

The advantages of the direction signal circuit of this invention over prior signal circuits is readily apparent. In the park or conditional twilight traveling condition all of the lamps are lighted. In the coasting condition all of the lights flash intermittently. In the braking condition, lights burn brightly in the front and rear of the motor vehicle. In a contemplated turn condition, the lights on the side toward which the operator intends to turn flash intermittently. In the braking-contemplated turn condition, the lights on the side toward which the operator intends to turn flash while the other lights burn steadily. In the emergency park condition all of the lamps flash. Further the dash lights indicate the inoperativeness of one or more of the signal lights and further indicate on which side the inoperativeness occurs.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A direction signal circuit for motor vehicles comprising a right front lamp, a left front lamp, a right rear lamp and a left rear lamp; a current source; an accelerator switch having a two-position contact with an actuated position and an unactuated position; an accelerator pedal; means responsive to the depression of said accelerator pedal for actuating said accelerator switch; means responsive to the release of said accelerator pedal for placing said contact of said accelerator switch in said unactuated position; intermittent current interrupter means, said current interrupter means being characterized by intermittently opening and closing a contact when subjected to a current flow of predetermined magnitude; a normally-open ignition switch; a normally-open park switch; a resistor; means subjecting said current interrupter means to the current flow from said current source through said resistor and said park switch connected in series with said resistor having a large enough resistance to prevent the intermittent opening and closing of said contact of said current interrupter means; means connecting said ignition switch in parallel with said series connected resistor and park switch; and means connecting all of said lamps to said source through said unactuated position of said accelerator switch connected in series with said normally closed contact of said current interrupter means and through said parallel ignition switch-park switch-resistor connection.

2. A direction signal circuit for motor vehicles comprising a right front lamp, a left front lamp, a right rear lamp, and a left rear lamp; a current source; a brake switch having contacts positioned to move between an actuated position and an unactuated position; a brake; means responsive to the actuation of said brake for moving said contacts of said brake switch from said unactuated position to said actuated position; a turn switch having contacts positioned to move between a neutral position and a Left and Right selectively settable positions; an accelerator switch having contacts positioned to move between an open position and a closed position; an accelerator; means responsive to the actuation of said accelerator for moving said contacts of said accelerator switch from said closed position to said open position; an ignition switch having a normally open contact; intermittent current interrupter means having a contact which is normally closed and which opens and closes intermittently when subjected to current flow of predetermined magnitude; means responsive to the closing of said ignition switch when said brake switch and said accelerator switch are in said unactuated positions and when said turn switch is in said neutral position for energizing all of said lamps from said source through said current interrupter means; means responsive to the actuation of said brake switch when said turn switch is in said neutral position for energizing all of said lamps constantly from said source; means responsive to the positioning of said turn switch in said Left position and to the closing of said ignition switch for energizing said left front and rear lamps from said source through said contact of said current interrupter means; means responsive to the positioning of said turn switch in said Right position and to the closing of said ignition switch for energizing said right front and rear lamps from said source through said contact of said current interrupter means; means responsive to the actuation of said brake switch when said turn switch is in said Left position for constantly energizing said right front and rear lamps from said source; and means responsive to the actuation of said brake switch when said turn switch is in said Right position for constantly energizing said left front and rear lamps from said source.

3. A direction signal circuit as recited in claim 2 and further comprising a park switch having a normally-open contact; and means responsive to the closing of said park switch when said brake switch and said accelerator switch are in said unactuated positions and said turn switch is in said neutral position for constantly energizing all of said lamps from said source.

4. A direction signal circuit as recited in claim 2 and further comprising a park switch having contacts positioned to move between an open position and a closed position; and means responsive to the closing of said park switch when said brake switch is in said unactuated position and said turn switch is in said neutral position for constantly energizing all of said lamps from said source.

5. A direction signal circuit as recited in claim 2 and in which said left front and rear lamps are connected in parallel and in which said right front and rear lamps are connected in parallel and further comprising a right dash lamp; a left dash lamp; means for electrically connecting said right dash lamp in series with said parallel-connected right front and rear lamps; and means for electrically connecting said left dash lamp in series with said parallel-connected left front and rear lamps.

References Cited in the file of this patent

UNITED STATES PATENTS

| | | |
|---|---|---|
| 2,275,695 | Stafford | Mar. 10, 1942 |
| 2,321,803 | Falge et al. | June 15, 1943 |
| 2,692,981 | Hollins | Oct. 26, 1954 |
| 2,810,899 | Foster | Oct. 22, 1957 |